April 5, 1966     C. L. WHITEFORD     3,244,859
INFRARED FOOD HEATER
Filed Jan. 7, 1963     2 Sheets-Sheet 1
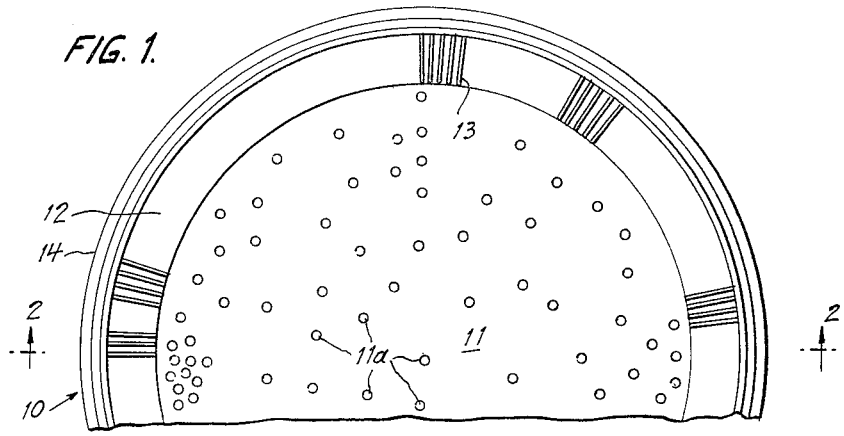
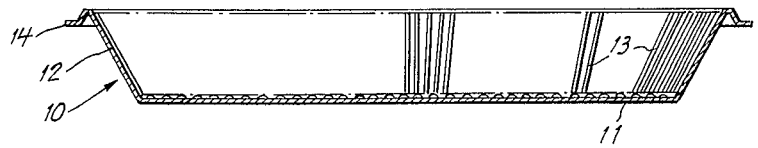
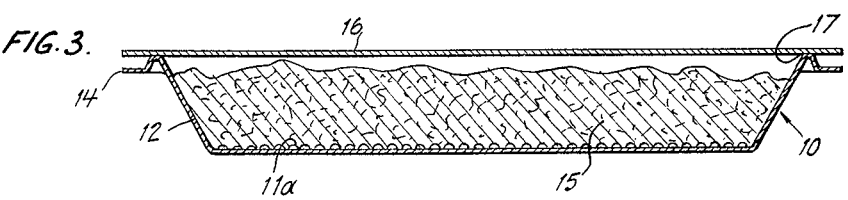
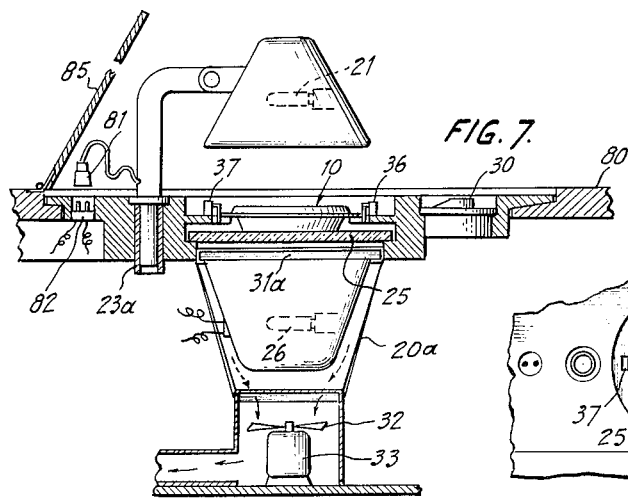
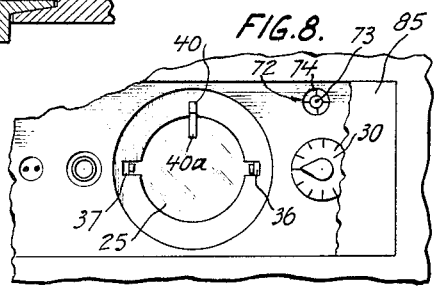
INVENTOR.
CARLTON L. WHITEFORD
BY
*Clyde G. Tinton*
ATTORNEY April 5, 1966  C. L. WHITEFORD  3,244,859
INFRARED FOOD HEATER
Filed Jan. 7, 1963  2 Sheets-Sheet 2
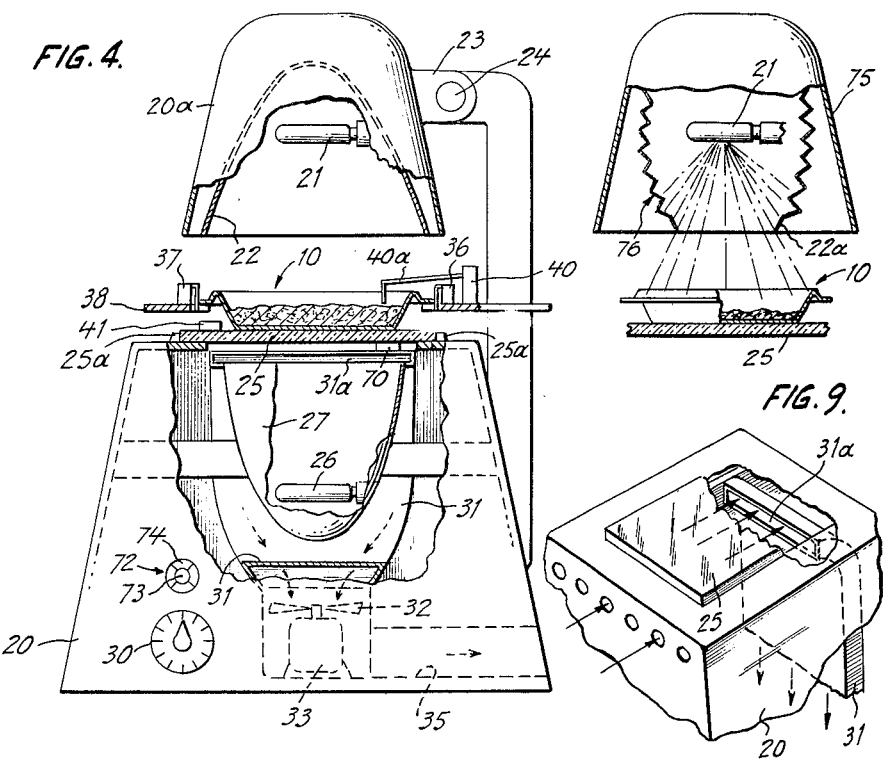
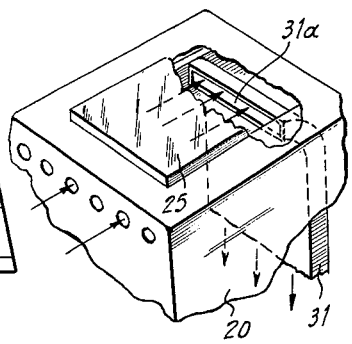
INVENTOR.
CARLTON L. WHITEFORD
BY
ATTORNEY United States Patent Office 3,244,859
Patented Apr. 5, 1966

3,244,859
INFRARED FOOD HEATER
Carlton L. Whiteford, New Canaan, Conn., assignor to Poly-Pak Corporation of America, Springdale, Conn., a corporation of Delaware
Filed Jan. 7, 1963, Ser. No. 249,821
17 Claims. (Cl. 219—348)

This invention relates to infrared food heating units particularly adapted to receive a transparent plastic dish of cooked and frozen or refrigerated food, and to heat the food therein quickly to the desired eating temperature in a minimum of time, such as of the order of two minutes, and also to cook raw food in such a dish, although it will be understood that the time required for cooking will be somewhat longer than that required to heat previously cooked food. It also contemplates a novel plastic dish or container to hold the food to be heated, and which may be used in my heating unit without damage to the dish or heater unit. My invention also contemplates such a dish having a hermetically sealed cover protecting the food against contamination by foreign matter and air, but which, after removal of the cover, by a simple peeling operation, can be placed in the heater and the food therein brought to the desired temperature in a matter of minutes, without damage to the dish or to the heater.

In accordance with my invention, I provide an infrared heating unit having an easily cleanable platform transparent to the radiation employed, for supporting the dish of food to be heated, and having a first source of infrared radiation positioned under said platform to project beams of infrared radiation through the platform and then through the bottom of said dish, and a second source of infrared radiation above said dish and projecting beams of infrared radiation directly into the food in said dish. The equipment is so designed as to concentrate and confine the beams of radiation through the bottom of the dish, and into the food contained therein, so that a minimum of the radiation is dissipated in undesired areas, wasting energy.

A timer is provided which can be set to maintain the radiation for a length of time specified by the food packager and marked on the package, and/or required by the food, and to shut off the radiation at the expiration of the time set. Preferably, the timer is provided with quick detachable plug-in connections, so that, in case of failure of the timer, it may be quickly unplugged and a spare timer plugged in, to continue the heater in service.

In addition, I propose to provide certain safety features to prevent malfunction of the unit. Among these may be mentioned switches to prevent turning on of the heat sources in the absence of a dish of food on the platform, or in case the dish has been placed in an incorrect position; a feeler switch preventing turning on of the heat sources in case the cover has not been removed from the dish; a thermal responsive switch for turning off the heat sources in case the platform supporting the dish exceeds a predetermined temperature, and another switch turning off the heat sources or preventing turning them on if either of the sources fails.

Another feature of my invention is the provision of a fan or fans arranged to blow or suck (the latter is preferred) air across the lower surface of the platform when the heat sources are in operation, and if desired, ducts for expelling used air away from the unit, to minimize the spread of food odors. It is desirable also to arrange the upper heat source so that it may be swung out of heating position to enable quick and easy replacement of the infrared lamp or lamps employed, in case of failure. The lamps employed are preferably infrared lamps having a coil which is a close approximation to a point source, and these are preferably placed at the general focal area of specially contoured reflectors, to project beams of radiation onto and into the food in a uniform manner.

From the foregoing, it will be understood that among the objects of my invention are:

To provide a compact, efficient, and relatively inexpensive infrared heater for food, refrigerated or frozen, capable of bringing such food contained in a throw-away plastic dish to the desired temperature for eating in a matter of a very few minutes, without damage to the plastic dish.

To provide such a heater with built-in safety features to prevent improper operation of the unit, improper heating of the food, or damage to the unit or to the dish containing the food to be heated therein.

To provide such a unit which is small in size, light in weight, and speedy in operation, making it particularly useful in aircraft for serving hot food in flight, and for use in industrial cafeterias where comparatively large numbers of people are served in relatively short times; and for home-prepared or purchased foods and for cooking.

To provide such a heater requiring minimum mechanical and electrical maintenance, and in which most failures may be easily and quickly rectified without the necessity of calling in technical service men, with the attendant delay and expense, and the loss of use of the unit while awaiting repairs.

To provide an inexpensive plastic dish for use in my unit for containing the food to be heated, and which may be protected by a hermetically sealed cover, readily removable by simply peeling off the cover when the food is to be heated.

Still other objects and advantages of my invention will be apparent from the specification.

The features of novelty which I believe to be characteristic of my invention are set forth with particularity in the appended claims. My invention itself, however, both as to its fundamental principles and as to its particular embodiments, will best be understood by reference to the specification and accompanying drawing, in which FIG. 1 is a top plan view of a plastic dish for use in my infrared heating unit, FIG. 2 is a sectional elevation on lines 2—2 of FIG. 1, FIG. 3 is a similar sectional view of a dish after food has been placed in it and the plastic cover peelably heat-sealed in position, FIG. 4 is a diagrammatic front elevation, partly broken away, of a unit in accordance with my invention, FIG. 5 is a wiring diagram of my unit showing the various internally incorporated safeties employed, FIG. 6 shows one form of reflector which I may employ, FIG. 7 is a sectional view of a modified form of heating unit according to my invention, particularly adapted for mounting in a counter, FIG. 8 is a top plan view of the modification of FIG. 7, mounted in a counter, and FIG. 9 is a detail perspective view showing the platform and a portion of the duct for drawing air across the lower surface of the platform.

Referring now more particularly to FIGS. 1-3, 10 designates one form of dish or container for holding the food to be heated. The dish is formed from sheet plastic, preferably polypropylene, although I may employ other plastics, such as polycarbonates or polyvinyls, of the order of a few thousandths of an inch in thickness. In the form shown, the dish is circular, but it may also be made oval, or rectangular with rounded corners if desired.

The dish has a generally flat bottom portion 11, which may be corrugated or embossed, with upwardly extending projections 11a capable of providing a space under solid food in said dish, substantially transparent to the radiation employed, and also preferably transparent to visible light, to permit the food content to be inspected. Surrounding the bottom 11 is an upwardly and outwardly extending side portion 12, preferably provided with reinforcing ribs or stiffening corrugations 13. For simplicity only a few of these are shown, but it will be understood that they may extend entirely around portion 12. At the upper edge of portion 12 I provide an outwardly extending rim 14, to the inner part of which a plastic cover 16 may be peelably heat-sealed, as shown in FIG. 3, after the food 15 is in the dish. The heat sealing provides a hermetically sealed joint 17, but one which can be readily peelably removed, protecting the contents from contamination and access of air, and from leakage of liquid content.

It is important that the temperature be accurately controlled in sealing the cover to the dish, so as to provide a hermetically sealed but still readily peelable bond. Too high a temperature in sealing will cause what is called a weld. If a weld occurs, the cover cannot be readily removed by peeling.

The thickness and stiffness of the material of the dish is chosen to provide a container of plastic holding the food, which may be frozen or kept refrigerated after the dish is filled and sealed, if desired. The dish, covered or uncovered, together with its contents, forms a unit of sufficient strength to withstand normal handling hazards. If purchased with its contents hermetically sealed and protected from outside contamination, it need not be packaged in a separate container such as a cardboard box. The cover may have imprinted on it the name of its contents, the name of the packager, and directions for heating, including the setting of the timer for heating, and any other information and/or decorative material designed or required.

Referring now more particularly to FIG. 4, the heating unit comprises a lower housing 20 carrying an infrared lamp 26 mounted in a suitable reflector 27, and an upper housing 20a having an upper infrared lamp 21 in reflector 22 carried by bracket 23, which may be hinged as at 24, extending from the side or back of the lower housing 20, so that in case of failure of lamp 21, the lamp and reflector assembly may be swung upwardly to permit easy removal of lamp 21 and the insertion of a new one.

The dish 10 is arranged to be placed on platform 25, which is substantially transparent to infrared radiation, and the platform may be glass, quartz, specially coated glass, or high-melting-point transparent plastic. Locating bosses 25a may be formed in the top of housing 20 at points desired, to facilitate proper positioning of platform 25, and to prevent accidental displacement, while still permitting free removal of the platform for cleaning or access to the interior of the housing.

An adjustable timer 30 is provided which may be set by the user for the length of time specified on the dish of food to be heated, and when set, will close the circuit energizing lamps 21 and 26, and will turn them off at the expiration of the time set. Since such a timer is well known, and easily obtainable, it is not believed necessary to describe it in detail. It should be noted, however, that timer 30 should be mounted in the housing in a manner to be easily removable, and with quick plug-in connections 76 so that in case of failure of the timer, it may be unplugged and quickly removed from the machine, to permit a spare timer to be plugged in, thereby eliminating the necessity for taking the heater unit out of service while waiting for a serviceman to come and make repairs. Fuse 77 may also be provided in the power input.

In order to keep the temperature of the platform 25 low enough so as not to cause melting or sticking of the plastic dish, preferably provision is made for passing a stream of air across the bottom of platform 25 whenever lamp 26 is on. This may be accomplished, for example, by providing a duct 31 having an intake opening 31a, as shown in FIG. 9, substantially the width of the platform 25, and at the rear of the platform. The cooling air passes to fan 32, driven by motor 33. Connections are provided from timer 30 to energize fan motor 33 whenever lamp 26 is on. The exhaust air may be passed through outlet duct 35 and exhausted preferably outside the room, to prevent the accumulation of food odors.

Certain safety features are preferably incorporated to prevent damage to the machine in operation, or to the food being heated. These may comprise positioning micro-switches 36 and 37 to be closed by dish 10 when properly positioned in the heater, but otherwise to remain open. These may be mounted on the inner surface of a guide collar 38 carrried by housing 20, arranged to insure inserting the dish in proper position for heating of the food. A third micro-switch 40 may be mounted on the guide 38 to serve as a feeler, preventing operation of the heater unless the cover has been removed from the food. For this purpose the switch 40 may have a feeler arm 40a, and if the cover is removed, the feeler arm drops below the cover level, closing switch 40. If the cover has not been removed, the feeler arm cannot drop, and switch 40 remains open. Supplementary back contacts may be arranged on switch 40 to actuate an indicator, such as a warning light illuminating the legend, "Remove Cover," when feeler arm is held up by the cover.

An additional safety is preferably provided in the form of temperature actuated switch 41 responsive to the temperature of the upper surface of platform 25, and arranged to open the lamp circuits in case the temperature goes above a predetermined degree, for example, 280° F.

Still another safety feature is provided preventing operation of lamps 21 and 26 if either lamp fails. A circuit for incorporating these safety features is shown, for example, in FIG. 5. In this instance, in case it is desired to avoid line voltage on the various switches where they might constitute a hazard, the line voltage output from the timer 30 may be passed through transformer 43, stepping the voltage down to the desired level. One terminal of the secondary of transformer 43 is connected to fixed contact 44 of switch 36. As will be understood, this switch is normally biased to open position, and is closed only when a dish of food is in proper position on the platform 25. The circuit may then go from movable contact of switch 36 to fixed contact 46 of switch 37, which, like switch 36, is biased to open position, and closed only when the dish is in proper position on the platform 25. The circuit may then pass to fixed contact 48 of temperature responsive switch 41, which may be a bimetallic thermostatic type of switch which opens when the temperature exceeds the predetermined selected degree.

The circuit then goes to fixed contact 50 of feeler switch 40, and the movable contact will remain open if the cover has not been removed from the dish. If the cover has been removed, feeler arm 40a of switch 40 drops, permitting closure of switch 40, and applying voltage to fixed contact 52 of safety switch 53, the movable contact of which is held in contact with fixed contact 52 by electromagnet 54, which is connected in series in the current feed to lamps 21 and 26. Upon closure of the movable contact of switch 53 against fixed contact 52, the circuit is completed through electromagnet 56, and to the other side of the secondary of transformer 43. Coil 54 is so arranged as to maintain the movable contact of switch 53 closed when both lamps 21 and 26 are drawing normal current, but to permit said switch to open should either lamp fail and the current thereby drop.

Lamps 21 and 26 are preferably arranged for operation in parallel, and may be energized from the line side of transformer 43 through movable contact 58, fixed contact 59 of switch 60, normally biased to open position, but closed when electromagnet 56 is energized.

As will be understood, switches 36, 37, 41, 40, and 53 are all in series, and for current to flow in the circuit, all must be closed, the opening of any switch mentioned opening the circuit. When the circuit is opened, no current can pass through relay coil 56 and movable contact 58 of switch 60 drops out, opening the power circuit to lamps 21 and 26. From this it will be understood that should either of the switches 36 or 37 be open due to incorrect position of the dish, or should the temperature of the platform 25 get too high, or should the cover not have been removed, the circuit will be incomplete, and relay 56 will be de-energized, opening the power circuit to lamps 21 and 26. The same will happen should either of the lamps 21 and 26 be burned out. It will be noted that not only will it be impossible to start the heating unit if either of lamps 21 or 26 is burned out, but should burnout occur during the operation, the line circuit to lamps 21 and 26 will be immediately opened, precluding use of the heating unit until the defective lamp is replaced.

It will be noted that before a dish of food has been placed on platform 25, switches 36, 37, 40, 53, and 60 are all open, and switch 41 is closed and no current can pass through electromagnet 56. When a dish of food with the cover off is placed in proper position, switches 36, 37, and 40 will be closed, but switches 53 and 60 will still be open. In order to light lamps 21 and 26, a second feed circuit to said lamps may be provided by conductors 64 and 65, bypassing switch 60, applying line voltage to lamps 21 and 26 through a passing contact on timer 30 to energize the lamps momentarily when the timer is set. This energizes coil 54, closing switch 52, and energizing coil 56, closing switch 60. The passing contact on timer then opens.

Certain other desirable features may and preferably will be employed. One of these may be a "Syntron" type vibrator 70 to provide stirring of the food to be heated. Such a vibrator may be attached to the under side of platform 25, or to guide 38. Since such vibrators are well known and easily obtainable on the market, it is not necessary to describe their operation.

It is desirable that the upper heat source and reflector be spaced upwardly from platform 25 by a distance of several inches, say 4 or 5, to prevent splatter and food explosions from contaminating the upper reflector, and to permit manual stirring of the food and handling of the dish.

I have found, in the use of my heating unit, that it is desirable to provide means for controlling the heat supplied by the upper source, to prevent crusting, which interferes with the radiation of heat into the lower food layers in the dish. In its simplest form this may be a flasher type switch 71 in series with the upper lamp 21 (FIG. 5) and, if desired, this may be adjustable to control the relative on and off time of lamp 21. Preferably switch 71 will be mounted in an easily accessible position in the housing, for example, as shown at 72 adjacent the timer, and having an adjusting knob 73 and calibrated dial 74.

To prevent operation of the safety switch 56 which opens the power circuit to the lamps in case of failure of either, relay coil 54 may be of the slow acting type, which will not drop out switch 53 for the flashing interruption of the circuit of upper lamp 21, but will drop out switch 52 in case of failure, such as burnout, of either lamp. If such an arrangement is employed, the passing contact on timer 30 should remain closed, supplying power to both lamps, until relay coil 54 pulls in movable contact 53, thereby energizing and closing power switch 60.

It is desirable to use full voltage on upper lamp 21, with a percentage timer (on-off switch) to control the heat radiated by the upper lamp, rather than to reduce the voltage and thereby the current through the lamp, since the radiation characteristic of such lamps varies as the voltage drops below the rated value.

To reduce stray radiation, the upper lamp 21 may be mounted in a special type reflector 76, within upper housing 75, as shown in FIG. 6. It is to be noted that the lower edge of reflector 76 intercepts any direct radiation from lamp 21 which would otherwise not impinge on the food in the dish, and such radiation, after reflection, passes to the food in the dish.

Using a generally parabolic reflector, as in FIG. 4, reflected rays can be collected and confined to the food, but direct rays from lamp 21 may not be so confined, particularly when the lower edge of the upper housing is spaced several inches away from the food, which would cause waste of energy and undesired heating of parts not desired to be heated. This may be prevented by using the specially designed reflector 22a, which confines direct rays as shown, to the surface of the food. By design of the reflector all other rays are reflected and eventually impinge on the surface of the food.

It should be noted that my heater unit and dish may be used to cook raw food, but care should be used that the fat content of such does not have a melting point above that which will melt the plastic employed. Pork chops are an example of food which will do so.

Referring now more particularly to FIGS. 7 and 8, 80 designates a counter top which has an opening cut away to receive the housing 20a of the lower heater and platform 25 and associated equipment. In this instance it may be desired to have a flush plate covering the heater unit when not in use. To provide this, bracket 23 may be arranged to be removably plugged into a socket 23a, and have a quick detachable electrical connection to the unit circuit as by jack 81 and plugs 82. In this embodiment of my invention, timer 30 and flasher control knob 73 and 74 may be mounted on the top surface of the unit. The opening in which the lower heater unit is mounted may be provided with a hinged cover 85.

To provide a flush working surface, it is only necessary to unplug connection 81, lift out bracket 23, and close the cover 85.

In the foregoing, I have shown and described certain preferred forms of my invention, and the best mode presently known to me for employing the same, but it will be understood that modifications and changes may be made without departing from the spirit and scope of my invention.

I claim:

1. An infrared food heater for a dish of synthetic plastic material containing food comprising a platform substantially transparent to infrared radiation for supporting a dish of synthetic plastic material containing food; means below said platform for projecting a beam of infrared radiation through said platform and confining said beam substantially to an area of said platform corresponding to the bottom of the dish supported thereon; means above said platform for projecting a beam of infrared radiation towards said platform and confining said beam substantially to an area of said platform corresponding to the area of the surface of the food received within the dish supported thereon; and means for cooling said platform to maintain the upper surface thereof below a predetermined temperature corresponding to the temperature at which the synthetic plastic material of the dish supported on the platform will be affected adversely.

2. The infrared food heater of claim 1 wherein said means for cooling said platform comprises means for passing a current of air under said platform.

3. The infrared food heater of claim 2 wherein said air current passing means is a device producing suction to draw vapors outwardly from about said platform.

4. The infrared food heater of claim 1 wherein said infrared projecting means above and below said platform each comprises an infrared radiator of relatively small width and a reflector thereabout for collecting and concentrating the radiation from said radiator.

5. An infrared food heater for a dish of synthetic plastic material containing food comprising a platform substantially transparent to infrared radiation for supporting a dish of synthetic plastic material containing food; means below said platform for projecting a beam of infrared radiation through said platform and confining said beam substantially to an area of said platform corresponding to the bottom of the dish supported thereon; means above said platform for projecting a beam of infrared radiation towards said platform and confining said beam substantially to an area of said platform corresponding to the area of the surface of the food received within the dish supported thereon; means for cooling said platform to maintain the upper surface thereof below a predetermined temperature corresponding to the temperature at which the synthetic plastic material of the dish supported on the platform will be affected adversely; and control means for said infrared projecting means above and below said platform.

6. The infrared food heater of claim 5 wherein said control means includes a sensor connected to said platform and operable to discontinue operation of the infrared projecting means when the temperature of said platform exceeds a predetermined temperature.

7. The infrared food heater of claim 5 wherein said control means includes means preventing operation of both of said infrared projecting means upon failure of one infrared projecting means.

8. The infrared food heater of claim 5 wherein said control means includes a timer operable to energize said infrared projecting means.

9. The infrared food heater of claim 5 wherein said control means is operative to modulate the radiation of said infrared projecting means above said platform.

10. The infrared food heater of claim 5 wherein said control means includes a switch periodically interrupting the operation of said infrared projecting means above said platform.

11. The infrared food heater of claim 5 wherein said control means includes a switch for periodically interupting the operation of said infrared projecting means above said platform and means preventing operation of both of said infrared projecting means upon failure of one infrared projecting means, said last-mentioned means being operable to permit periodic interruptions in the operation of said projecting means above said platform without discontinuing operation of the heater.

12. The infrared food heater of claim 5 wherein said control means includes sensing means operable to energize said infrared projecting means only upon proper positioning of the dish upon said platform.

13. The infrared food heater of claim 5 wherein said control means includes sensing means above said platform preventing operation of the infrared projecting means upon actuation by a cover inadvertently left on the dish placed on said platform.

14. An infrared food heater for a dish of synthetic plastic material containing food comprising a platform substantially transparent to infrared radiation for supporting a dish of synthetic plastic material containing food; means below said platform for projecting a beam of infrared radiation through said platform and confining said beam substantially to an area of said platform corresponding to the bottom of the dish supported thereon; means above said platform for projecting a beam of infrared radiation towards said platform and confining said beam substantially to an area of said platform corresponding to the area of the surface of the food received within the dish supported thereon; means for cooling said platform to maintain the upper surface thereof below a predetermined temperature corresponding to the temperature at which the synthetic plastic material of the dish supported on the platform will be affected adversely; and control means for said infrared projecting means above and below said platform, said control means including sensing means above said platform preventing operation of the infrared projecting means upon actuation by a cover inadvertently left on the dish placed on said platform, a sensor connected to said platform and operable to discontinue operation of the infrared projecting means when the temperature of said platform exceeds a predetermined temperature, means preventing operation of both of said infrared projecting means upon failure of one infrared projecting means, and sensing means operable to energize said infrared projecting means only upon proper positioning of the dish upon said platform.

15. An infrared food heater for a dish of synthetic plastic material containing food comprising a support; a platform on said support substantially transparent to infrared radiation for supporting a dish of synthetic plastic material containing food; a first infrared heating assembly mounted on said support below said platform, said assembly including a source of infrared radiation and an enclosure therefor for collecting and projecting a beam of infrared radiation from said source through said platform and confining said beam substantially to an area of said platform corresponding to the bottom of the dish supported thereon; a second infrared heating assembly mounted on said support above said platform including a source of infrared radiation and an enclosure therefor for collecting and projecting a beam of infrared radiation towards said platform and confining said beam substantially to an area of said platform corresponding to the area of the surface of the food received within the dish; means on said support for cooling said platform to maintain the upper surface thereof below a predetermined temperature corresponding to the temperature at which the synthetic plastic material of the dish will be affected adversely; and control means for said infrared sources.

16. The infrared food heater of claim 15 wherein said second infrared heating assembly is pivotally mounted upon said support for movement from a heating position overlying said platform to a second position to render said platform and first heating assembly easily accessible.

17. The infrared food heater of claim 15 wherein said means for cooling said platform comprises means for passing a current of air under said platform.

References Cited by the Examiner

UNITED STATES PATENTS

| 932,539 | 8/1909 | Denhard | 219—518 X |
|---|---|---|---|
| 968,683 | 8/1910 | Parkhurst et al. | 219—414 |
| 1,516,054 | 11/1924 | Mottlau | 219—349 |
| 2,152,261 | 3/1939 | Kahn | 219—452 X |
| 2,198,645 | 4/1940 | Walcott | 219—461 X |
| 2,342,077 | 2/1944 | Jepson | 219—490 |
| 2,451,518 | 10/1948 | Stickland | 219—480 |
| 2,644,874 | 7/1953 | Miller | 200—138 |
| 2,708,708 | 5/1955 | Ronsch | 219—392 |
| 2,761,051 | 8/1956 | Dodson | 219—483 |
| 2,824,943 | 2/1958 | Laughlin | 219—347 X |
| 2,864,932 | 12/1958 | Forrer | 219—411 X |
| 2,913,547 | 11/1959 | Zazzara | 200—61.41 |
| 2,990,286 | 6/1961 | Clarke et al. | 99—171 |
| 3,010,006 | 11/1961 | Schwaneke | 219—442 |
| 3,014,114 | 12/1961 | Merklein | 219—447 |
| 3,027,434 | 3/1962 | Palermo | 200—51 |
| 3,054,679 | 9/1962 | Bradford | 99—171 |
| 3,062,941 | 11/1962 | White | 219—493 X |

FOREIGN PATENTS

| 752,400 | 6/1953 | Germany. |
|---|---|---|
| 462,612 | 3/1937 | Great Britain. |

RICHARD M. WOOD, *Primary Examiner.*